United States Patent
Chen et al.

(10) Patent No.: US 7,755,342 B2
(45) Date of Patent: Jul. 13, 2010

(54) MULTI-MODE SWITCHING CONTROL CIRCUIT AND METHOD FOR IMPROVING LIGHT LOAD EFFICIENCY IN SWITCHING POWER SUPPLIES

(75) Inventors: Rengang Chen, Los Angeles, CA (US); James Steven Brown, San Pedro, CA (US)

(73) Assignee: International Rectifier Corporation, El Segundo, CA (US)

( * ) Notice: Subject to any disclaimer, the term of this patent is extended or adjusted under 35 U.S.C. 154(b) by 318 days.

(21) Appl. No.: 11/743,468

(22) Filed: May 2, 2007

(65) Prior Publication Data

US 2008/0042709 A1    Feb. 21, 2008

Related U.S. Application Data

(60) Provisional application No. 60/797,766, filed on May 4, 2006.

(51) Int. Cl.
*G05F 1/56*    (2006.01)
(52) U.S. Cl. ................. 323/283; 323/271; 323/284; 323/285
(58) Field of Classification Search ............. 323/271, 323/282, 283, 284, 285
See application file for complete search history.

(56) References Cited

U.S. PATENT DOCUMENTS

| | | | |
|---|---|---|---|
| 6,977,492 B2 * | 12/2005 | Sutardja et al. | 323/283 |
| 6,992,469 B1 | 1/2006 | King | |
| 7,098,632 B2 * | 8/2006 | Chen et al. | 323/222 |
| 2002/0009979 A1 | 1/2002 | Kusunoki | |
| 2002/0190730 A1 | 12/2002 | Nitta | |
| 2003/0128555 A1 | 7/2003 | Schemmann et al. | |
| 2004/0196016 A1 * | 10/2004 | Sutardja et al. | 323/283 |
| 2007/0063682 A1 * | 3/2007 | Dagher | 323/282 |
| 2008/0284398 A1 * | 11/2008 | Qiu et al. | 323/283 |
| 2009/0066301 A1 * | 3/2009 | Oswald et al. | 323/271 |
| 2009/0115389 A1 * | 5/2009 | Chu et al. | 323/282 |

* cited by examiner

*Primary Examiner*—Jeffrey L Sterrett
(74) *Attorney, Agent, or Firm*—Farjami & Farjami LLP

(57) ABSTRACT

A circuit for transitioning between a discontinuous and a fixed frequency continuous conduction mode (DCM) and (CCM) of a power converter having a driver receiving PWM signals and controlling a switching stage comprises a control switch and a sync switch connected at a common switching node for driving a load. The circuit including a PWM modulator for providing PWM signals; and a mode selector for receiving a duty cycle value, a preset switching period, and a duty cycle at a critical conduction point having a switching frequency equal to the preset switching period and providing an on-time of the control switch and a switching period to the PWM modulator, wherein if the duty cycle value is greater than the duty cycle at a critical conduction point, the PWM modulator will drive will provide the PWM signals to operate the switching stage in the CCM with constant-frequency duty cycle control, and if the duty cycle value is less than duty cycle at a critical conduction point, the PWM modulator will drive will provide the PWM signals to operate the switching stage in the DCM by turning off the sync switch when a load current becomes negative.

20 Claims, 4 Drawing Sheets

MULTI-MODE SWITCHING CONTROL CIRCUIT AND METHOD FOR IMPROVING LIGHT LOAD EFFICIENCY IN SWITCHING POWER SUPPLIES

CROSS-REFERENCE TO RELATED APPLICATIONS

This application is based on and claims priority to U.S. Provisional Patent Application Ser. No. 60/797,766, filed on May 4, 2006 and entitled METHOD AND APPARATUS FOR IMPROVING LIGHT LOAD EFFICIENCY IN SWITCHING POWER SUPPLIES, the entire contents of which are incorporated by reference herein.

BACKGROUND OF THE INVENTION

The present invention relates to light-load efficiency of power converters, and more particularly to smooth transition between heavy- and light-loads of power converters.

Light-load efficiency of power converters is becoming increasingly important for switch mode power supply (SMPS) powered devices. Improved light-load efficiency helps save energy and extend battery life of the SMPS powered devices. Conventional methods for improving the light-load efficiency of the power converters include: reducing the circulation energy and associated losses by running a power converter's circuit in a discontinuous conduction mode (DCM); reducing switching losses by reducing switching frequency at a light load; and shutting down unnecessary phase(s) at a light load of a multi-phase converter. When the load current is high, it is preferable to operate a power converter in a fixed frequency continuous conduction mode (CCM), which allows a fast transient response, higher efficiency, and a narrower-spread noise spectrum. The key to achieving the best overall performance is knowing when and how to transition between the two modes.

Currently existing solutions for improving light-load efficiency of power converters include a constant on-time with valley-mode control, a hysteresis control, and a duty cycle control with pulse skipping/burst mode at light load methods. In the constant on-time with valley-mode control method, the control switch is turned on with a fixed period of time. The off-time is determined by a time at which the output voltage reaches or hits the valley threshold of the comparator. The disadvantages of this control are: variable frequency control for all input and load condition; instead of the average output voltage, the minimum output voltage is regulated to reference; the control is affected by the comparator delay; reliance on a reasonably large equivalent series resistance (ESR) of the output capacitor to generate the output voltage ramp for off-time comparison; and a need of a high-gain, high-bandwidth, low-offset differential amplifier to sense the output voltage ramp.

The hysteresis control method is similar to the constant on-time control, having the same advantages and disadvantages. However, both on-time and off-time of the control switch are controlled by the hysteresis of the comparator.

In the duty cycle control with pulse skipping/burst mode at light load method, a fixed-frequency duty cycle control is used when the load current is high. At light load, the control switch is turned ON only when the output voltage is less than the threshold and within the hysteresis of a comparator. This results in the control switch turning on for a few consecutive cycles and then keeping silent until the output voltage drops below the threshold. This control is not desirable because a burst mode at light load can cause the switching noise spectrum spread to a wide range, imposing EMI issues.

It is clear that the existing control methods either have variable frequency control at all time or have an abrupt transition between fixed and variable frequency when transitioning between heavy load and light load condition. The ideal solution is to have constant-frequency duty cycle control at heavy load condition, while using constant on-time variable frequency control at light load condition through a smooth transition. As a result, both the efficiency and switching noise concerns can be taken care of.

SUMMARY OF THE INVENTION

It is an object of the present invention to provide best overall performance at all load and input conditions.

It is another object of the present invention to provide constant-frequency duty cycle control at heavy load and constant on-time variable frequency control at light load.

It is yet another object of the present invention to provide a natural and smooth transition between heavy and light loads.

A circuit is provided for transitioning between a discontinuous and a fixed frequency continuous conduction mode (DCM) and (CCM) of a power converter having a driver receiving PWM signals and controlling a switching stage comprises a control switch and a sync switch connected at a common switching node for driving a load. The circuit including a PWM modulator for providing PWM signals; and a mode selector for receiving a duty cycle value, a preset switching period, and a duty cycle at a critical conduction point having a switching frequency equal to the preset switching period and providing an on-time of the control switch and a switching period to the PWM modulator, wherein if the duty cycle value is greater than the duty cycle at a critical conduction point, the PWM modulator will drive will provide the PWM signals to operate the switching stage in the CCM with constant-frequency duty cycle control, and if the duty cycle value is less than duty cycle at a critical conduction point, the PWM modulator will drive will provide the PWM signals to operate the switching stage in the DCM by turning off the sync switch when a load current becomes negative.

Other features and advantages of the present invention will become apparent from the following description of the invention that refers to the accompanying drawings.

DETAILED DESCRIPTION OF EMBODIMENTS OF THE INVENTION

Figure 1:
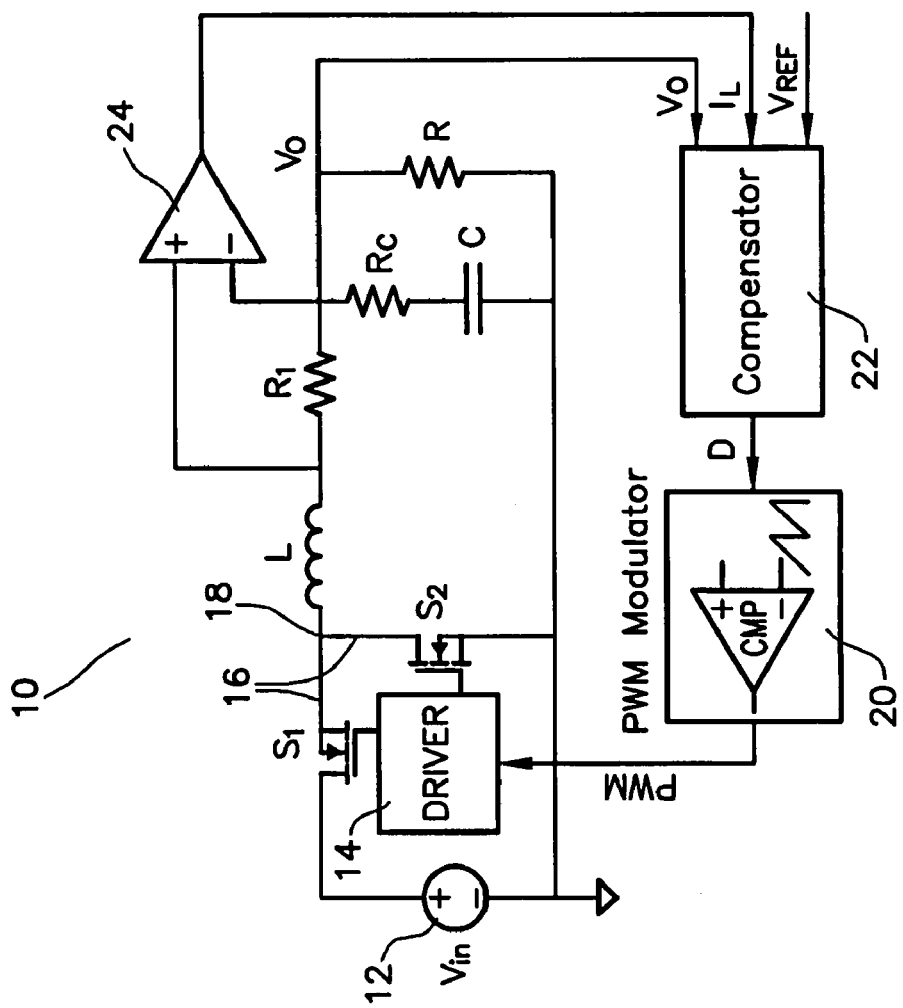
FIG. 1 is a diagram of a typical power converter having a feedback control.

In FIG. 1 a synchronous buck converter is used for illustrative purposes. However, the same principle may be applied to other topologies, as well. In FIG. 1 circuit 10 includes a driver 14 connected to gate terminals of a half-bridge stage 16 having transistors S1 and S2 connected at a common node 18. Second terminals of the transistors S1 and S2 being connected to a source 12. The driver 14 controlling the half-bridge stage 16 in accordance with PWM signals received from a PWM modulator 20. The PWM signals are based on a computed duty cycle value D provided by a compensator 22.

A load L is connected to the common node 18 and series connected to a resistor R1. The resistor R1 is connected at a second node to a resistor $R_C$ that is series coupled to a capacitor C and to a resistor R. An amplifier 24 receives its positive input from the connection between the load L and the resistor R1 and the negative input from the second node. The compensator 22 receives a predefined reference voltage $V_{REF}$, a load current $I_L$ from the amplifier 24, and a voltage $V_O$ from the second node.

The value D is defined as:

$$D = \frac{T_{ON}}{T_S},$$

where $T_{ON}$ is the on-time of the control switch S1 and $T_S$ is a switching period. In this conventional control scheme with a single compensator, either the on-time $T_{ON}$ of the control switch S1 (constant on-time) or $T_S$ (duty cycle control) are fixed. That is why a smooth transition between the two control modes is difficult.

Figure 2:
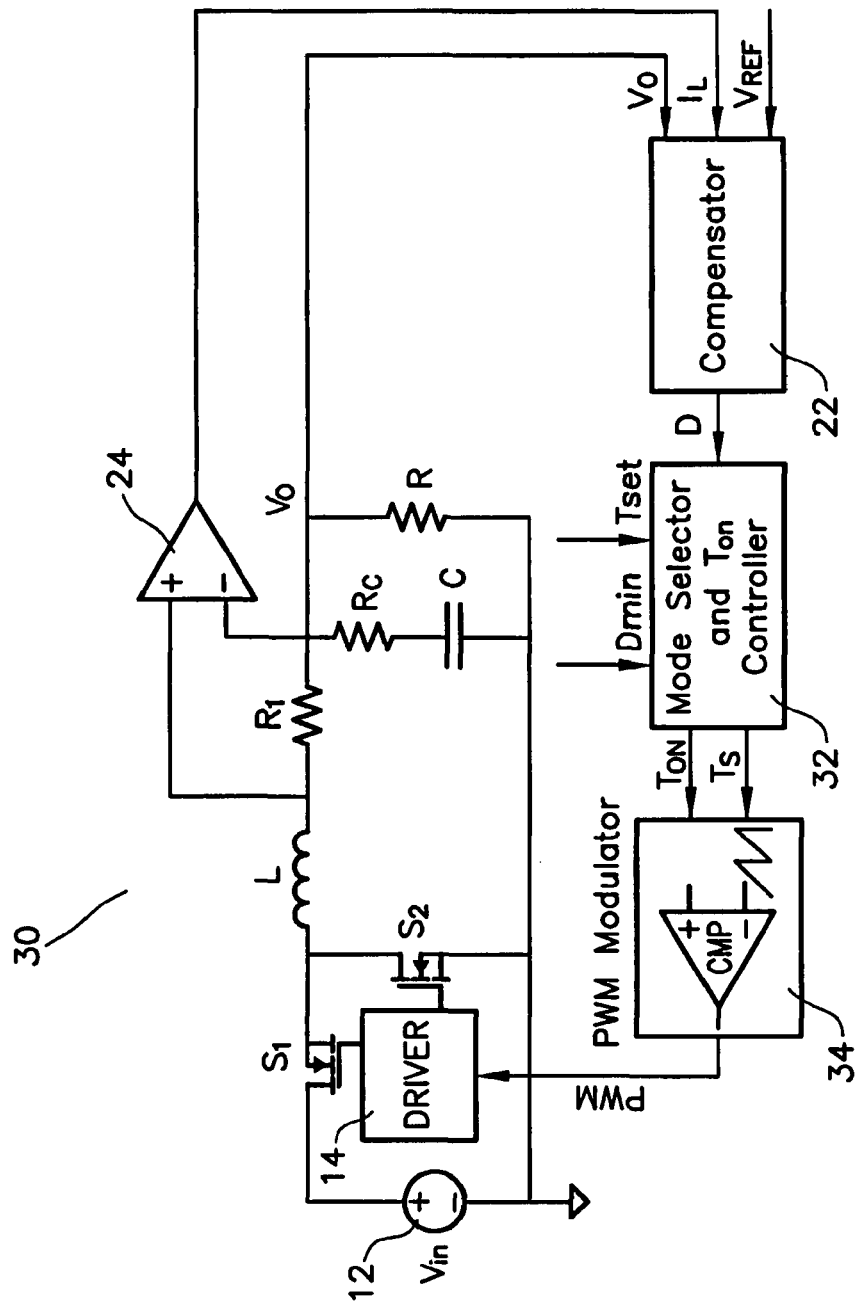
FIG. 2 is a diagram of a power converter having a control structure in accordance with a preferred embodiment of the present invention.

As illustrated in FIG. 2, a circuit 30 includes a mode selector 32. The mode selector and $T_{ON}$ controller 32 receives the duty cycle value D from the compensator 22. If $D > D_{MIN}$, where $D_{MIN}$ is the duty cycle at the critical conduction point with the switching frequency equals to a preset switching period $T_{SET}$, the mode selector controller block 32 will output $T_S = T_{SET}$ and $T_{ON} = D \times T_{SET}$. The power stage circuit 30 will operate in the CCM with constant-frequency duty cycle control.

Alternatively, if the $D < D_{MIN}$, the mode selector controller block 32 will turn off the sync switch when the inductor current becomes negative and push the power stage into the DCM. In this mode, the output $T_{ON} = D_{MIN} \times T_{SET}$. The output $T_S$ can then be computed using $$T_S = \frac{D_{MIN} \cdot T_{SET}}{D}.$$

This way, the mode selector $T_{ON}$ controller modulates the switching frequency at light load, instead of the duty cycle, to regulate the output voltage.

Because the power stage is reduced to a single-pole system when it is running in the DCM, the same compensator used for CCM can be directly used for DCM as well without raising issues of stability. Hence, no extra circuit complexities are required for the compensator design. It is clear that the transition between the two modes is smooth because of the nature of the power stage circuit.

The modified PWM modulator 34 requires an ability to change both, the on-time and the switching period. But it only needs to change one of them at any specific switching cycle.

The control proposed with reference to FIG. 2, can be implemented by an analog control, which, from a practical point of view, is complicated. Employing a digital control in the form of a microcontroller, microprocessor, DSP, or other digital implementation ("processor"), combined with a mixed signal input acquisition circuitry, it is possible to achieve a practical implementation of the power converter having the control structure of an embodiment of the present invention.

Figure 3:
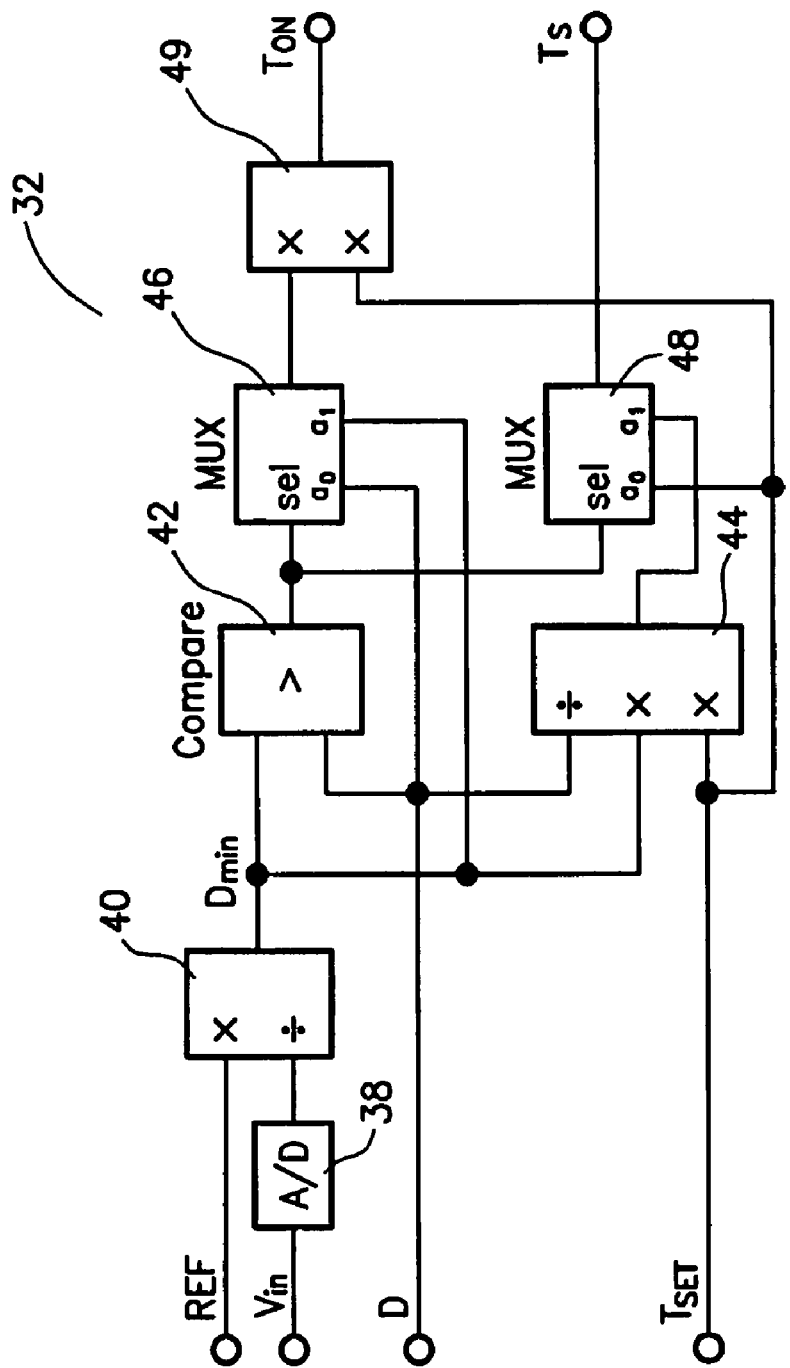
FIG. 3 is a block diagram of a digital implemented of a mode selector and $T_{ON}$ controller of FIG. 2.

FIG. 3 shows an implementation of the mode selector $T_{ON}$ controller 32 using basic logic and arithmetic cell units. The minimum duty cycle $D_{MIN}$ is approximated by an arithmetic unit 40 that accepts a reference voltage $V_{REF}$ and an input voltage $V_{in}$ and calculates $D_{MIN} = V_{REF}/V_{in}$. Prior to being accepted in the arithmetic unit 40, the input voltage $V_{in}$ is processed in an A/D converter 38. A more accurate result may be obtained if the load current and parasitic circuit parameters are taken into consideration.

A logic unit 42 compares the input duty cycle D with the minimum duty cycle $D_{MIN}$. An arithmetic unit 44 multiplies the minimum duty cycle $D_{MIN}$ with the preset switching period $T_{SET}$ and divide the product by the input duty cycle D.

The result of the logic unit 42 is used by two multiplexers 46 and 48 to control the on-time $T_{ON}$ of the control switch S1 and the switching period $T_S$ outputs. The multiplexer 46 provides a value selected between the minimum duty cycle $D_{MIN}$ and the input duty cycle D to an arithmetic unit 49, which multiplies that selected value with the preset switching period $T_{SET}$ to output the on-time $T_{ON}$ of the control switch S1.

The multiplexer 48 simply selects the switching period $T_S$ output between the preset switching period $T_{SET}$ and the product of the arithmetic unit 44.

Figure 4:
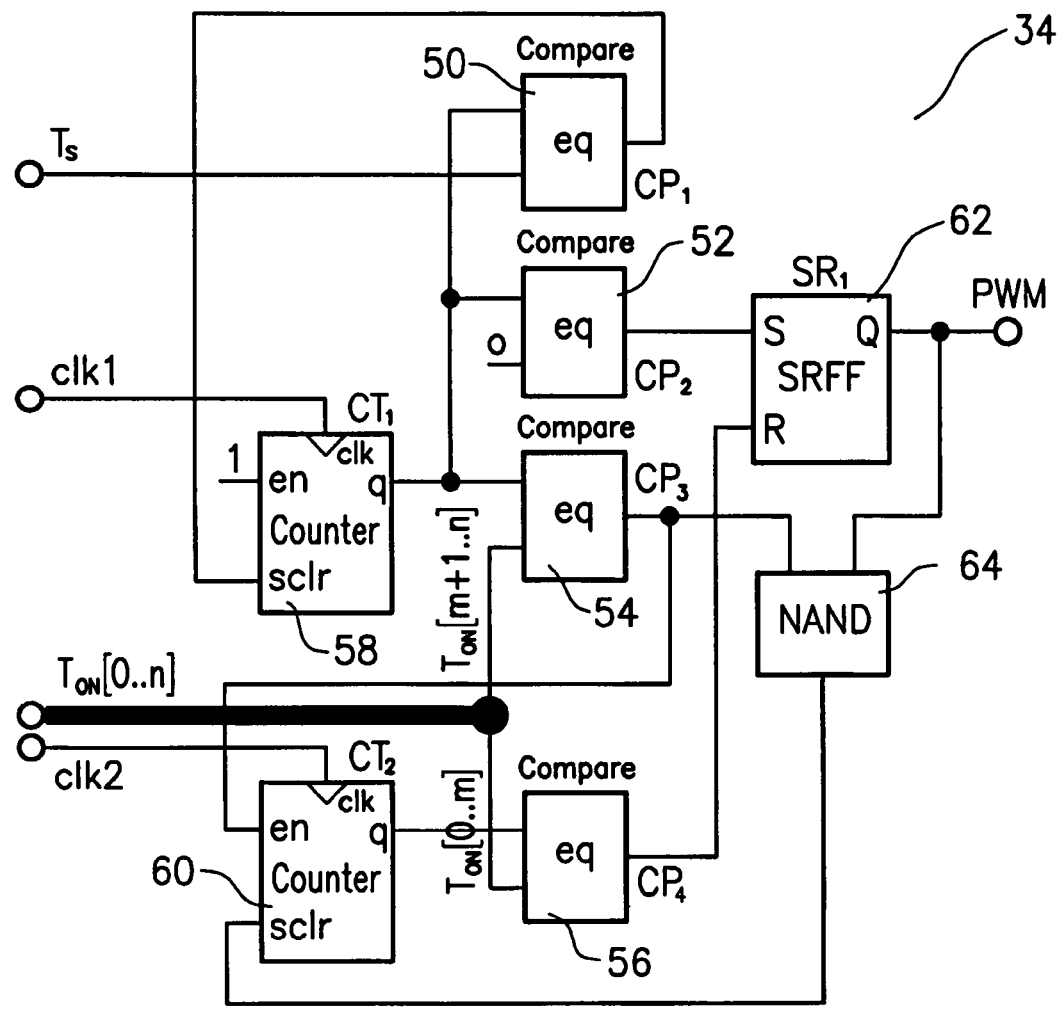
FIG. 4 is a block diagram of a modified PWM modulator of FIG. 2.

FIG. 4 shows a digital hybrid PWM implementation of the PWM multiplexer 34 with $T_{ON}$ and $T_S$ control. In this circuit 34, a high-bit free-running counter is replaced by a counter $CT_1$ 58 having enable and clear controls. The counter $CT_1$ 58 counting a clock signal clk1 to produce an output signal $Q_{CT1}$.

A comparator $CP_1$ 50 compares the output signal $Q_{CT1}$ to the switching period $T_S$; a comparator $CP_2$ 52 compares the output signal $Q_{CT1}$ to 0; and a comparator $CP_3$ 54 compares the output signal $Q_{CT1}$ to $T_{ON}[m+1 \ldots n]$. At the beginning, the signal $Q_{CT1}$ is zero, so a comparator $CP_2$ 52 outputs 1 to set the PWM latch $SR_1$ 62. This sets a PWM output at high. The counter $CT_1$ 58 starts to count when the signal clk1 is received.

When the signal $Q_{CT1}$ reaches $T_{ON}[m+1 \ldots n]$, this is detected by the comparator $CP_3$ 54, which issues an enabling signal to a comparator $CP_4$ 56 and a NAND circuit 64. The NAND circuit 64 performs a nand operation on the enabling and PWM signals to provide an sclr signal to the counter $CT_2$ 60.

When the low-bit counter $CT_2$ 60 is enabled and starts to count the high frequency clk2 signals to produce a $Q_{CT2}$ signal, the comparator $CP_4$ 56 compares the $Q_{CT2}$ signal to the $T_{ON}[0 \ldots m]$ signals. When the $Q_{CT2}$ signal equals to $T_{ON}[0 \ldots m]$, the PWM latch $SR_1$ 62 is reset and PWM returns to a low state. This implements the $T_{ON}$ control.

The high-bit counter $CT_1$ 58 continues to count until the output $Q_{CT1}$ equals $T_S$, at which point the counter $CT_1$ 58 is reset to set the PWM latch $SR_1$ 62 and bring the output PWM to a high state. This implements switching period $T_S$ control.

Although the present invention has been described in relation to particular embodiments thereof, many other variations and modifications and other uses will become apparent to those skilled in the art. It is preferred, therefore, that the present invention not be limited by the specific disclosure herein.

What is claimed is:

1. A circuit for transitioning between a discontinuous conduction mode (DCM) and a fixed frequency continuous conduction mode (CCM) of a power converter, said power converting having a driver receiving PWM signals and controlling a switching stage including a control switch and a sync switch connected at a common switching node for driving a load, the circuit comprising:

a PWM modulator for providing PWM signals; and
a mode selector for receiving a duty cycle value D, a preset switching period $T_{SET}$, and a duty cycle at a critical conduction point $D_{MIN}$ having a switching frequency equal to the preset switching period $T_{SET}$ and providing an on-time $T_{ON}$ of the control switch and a switching period $T_S$ to the PWM modulator, wherein
if the duty cycle value D is greater than the duty cycle at a critical conduction point $D_{MIN}$, the PWM modulator will provide the PWM signals to operate the switching stage in the CCM with constant-frequency duty cycle control, and
if the duty cycle value D is less than duty cycle at a critical conduction point $D_{MIN}$, the PWM modulator will provide the PWM signals to operate the switching stage in the DCM by turning off the sync switch when a load current becomes negative.

2. The circuit of claim 1, wherein for the PWM modulator to operate in the CCM the mode selector sets the switching period $T_S$ to equal the preset switching period $T_{SET}$ and the on-time $T_{ON}$ is set to equal a product of the duty cycle value D and the preset switching period $T_{SET}$.

3. The circuit of claim 1, wherein for the PWM modulator to operate in the DCM the mode selector sets the on-time $T_{ON}$ to the product of the duty cycle at a critical conduction point $D_{MIN}$ and the preset switching period $T_{SET}$.

4. The circuit of claim 3, wherein switching period $T_S$ is computed as $$T_S = \frac{D_{MIN} \cdot T_{SET}}{D}.$$

5. The circuit of claim 4, wherein the mode selector directs the PWM modulator to modulate a switching frequency at light load instead of the duty cycle D, thereby regulating the output voltage.

6. The circuit of claim 5, wherein the mode selector comprises:
an A/D converter for processing an input voltage $V_{in}$;
a first arithmetic unit for dividing a reference voltage by the input voltage $V_{in}$ to calculate a minimum duty cycle $D_{MIN}$;
a first logic unit for comparing the input duty cycle D with the minimum duty cycle $D_{MIN}$;
a second arithmetic unit for multiplying the minimum duty cycle $D_{MIN}$ with the preset switching period $T_{SET}$ and dividing the product by the duty cycle D;
a first multiplexer for using the result of the first logic unit to select between the duty cycle D and the minimum duty cycle $D_{MIN}$;
a second multiplexer for using the result of the first logic unit to select between the result of the second arithmetic unit and the preset switching period $T_{SET}$;
and an arithmetic unit for providing the on-time of the control switch $T_{ON}$ by multiplying the selection of the first multiplexer and the preset switching period $T_{SET}$.

7. The circuit of claim 3, wherein the PWM modulator has an ability to change the on-time and the switching period during a switching cycle.

8. The circuit of claim 7, wherein the PWM modulator comprises:
a latch for providing the PWM signals;
a first counter having enable and set clear controls for receiving and counting a first clock signal to produce a first signal, the first counter starting counting when the first clock signal is received;
a second counter having enable and set clear controls for receiving and counting a second clock signal to produce a second signal;
a first comparator for clearing the first counter when the first signal equals the switching period $T_S$, thereby implementing control of the switching period $T_S$;
a second comparator for comparing the first signal to zero and setting the latch to high when the first signal is zero;
a third comparator for comparing the first signal to $T_{ON}$[m+1 ... n] and providing a third signal to enable the second counter when the first signal is equal $T_{ON}$[m+1 ... n] when the second counter is enabled;
a fourth comparator for comparing the second signal to $T_{ON}$[0 ... m] and re-setting the latch when the second signal is equal to $T_{ON}$[0 ... m], thereby implementing the $T_{ON}$ control; and
a NAND circuit for performing a nand operation on the third and PWM signals to clear the second counter.

9. The circuit of claim 1, wherein the CCM is used when the load current of the power converter is high and allows a fast transient response, higher efficiency, and a narrower-spread noise spectrum and the DCM reduces circulation energy and associated losses of the power converter.

10. The circuit of claim 1, further comprising a compensator for receiving an output voltage $V_O$, a load current $I_L$, and a reference voltage and computing a duty cycle value D for the mode selector, wherein the same compensator is used in CCM and DCM.

11. The circuit of claim 10, wherein the duty cycle value D is a result of a division of an on-time of the control switch $T_{ON}$ divided by a switching period $T_S$.

12. The circuit of claim 1, wherein the on-time of the control switch $T_{ON}$ and the switching period $T_S$ are variable.

13. A multi-mode switching control circuit comprising:
a first sub-circuit configured to determine an ON time of a duty cycle of a switched system controlled by said multi-mode switching control circuit;
a second sub-circuit configured to determine a frequency of said duty cycle;
said multi-mode switching control circuit configured to modulate said ON time in a fixed frequency mode if said duty cycle is greater than a minimum duty cycle;
said multi-mode switching control circuit configured to modulate said frequency in a variable frequency mode if said duty cycle is less than said minimum duty cycle.

14. The multi-mode switching control circuit of claim 13, wherein said switched system is coupled to said multi-mode switching control circuit through a pulse width modulator configured to receive an output from said multi-mode switching control circuit and to provide a pulse width modulated signal to said switched system in response to said output.

15. The multi-mode switching control circuit of claim 13, wherein said switched system comprises a power converter.

16. The multi-mode switching control circuit of claim 15, wherein said fixed frequency mode results in said power converter operating in a continuous conduction mode (CCM).

17. The multi-mode switching control circuit of claim 15, wherein said variable frequency mode results in said power converter operating in a discontinuous conduction mode (DCM).

18. A method for use by a multi-mode switching control circuit, said method comprising:
determining a minimum duty cycle of a switched system controlled by said multi-mode switching control circuit;

modulating an ON time of a duty cycle of said switched system in a fixed frequency mode if said duty cycle is greater than said minimum duty cycle;

modulating a frequency of said duty cycle in a variable frequency mode if said duty cycle is less than said minimum duty cycle.

19. The method of claim 18, wherein said switched system comprises a power converter.

20. The method of claim 19, wherein said fixed frequency mode results in said power converter operating in a continuous conduction mode (CCM) and said variable frequency mode results in said power converter operating in a discontinuous conduction mode (DCM).

* * * * *